L. HANSON.
PROCESS FOR RECOVERING OIL AND OTHER PRODUCTS WHICH ARE FORMED DURING THE DESTRUCTIVE DISTILLATION OF WOOD.
APPLICATION FILED DEC. 16, 1915.
1,169,956.
Patented Feb. 1, 1916.
2 SHEETS—SHEET 1.
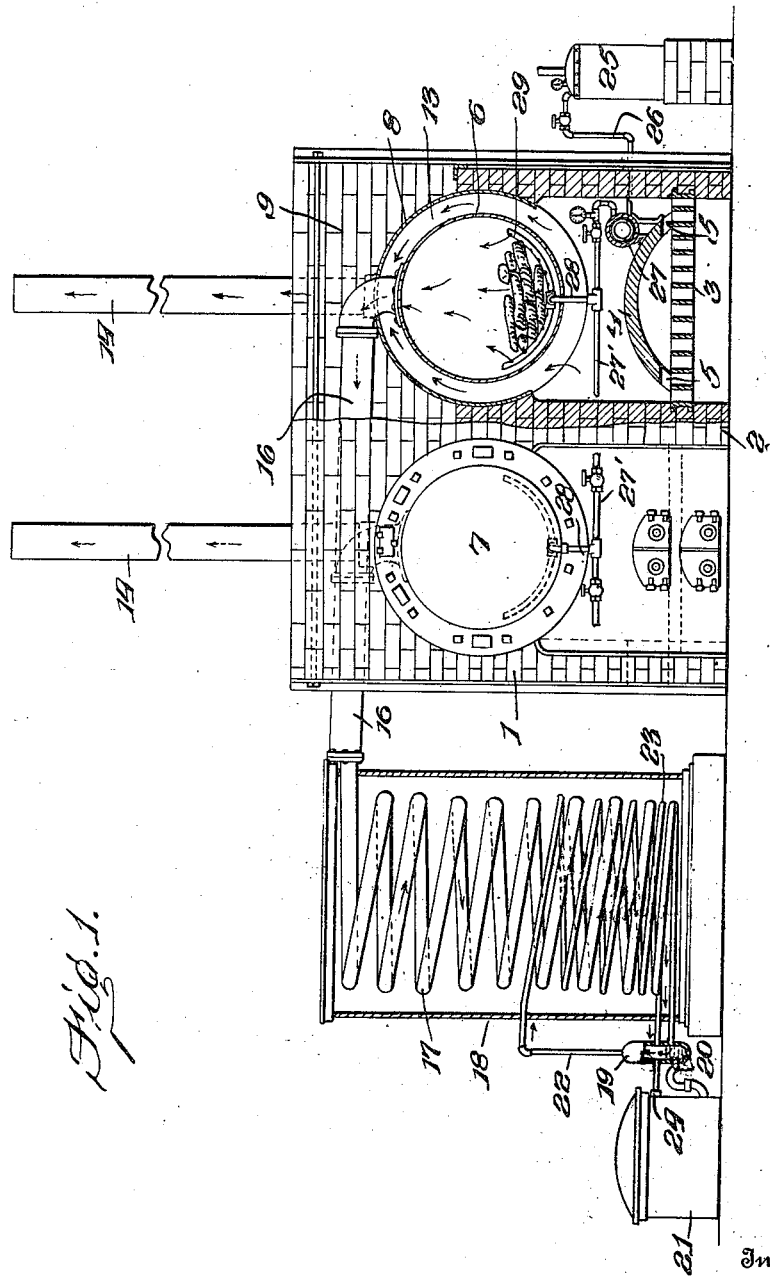
Fig. 1.
Inventor
L. Hanson
By  Attorney L. HANSON.
PROCESS FOR RECOVERING OIL AND OTHER PRODUCTS WHICH ARE FORMED DURING THE DESTRUCTIVE DISTILLATION OF WOOD.
APPLICATION FILED DEC. 16, 1915.
1,169,956.
Patented Feb. 1, 1916.
2 SHEETS—SHEET 2.
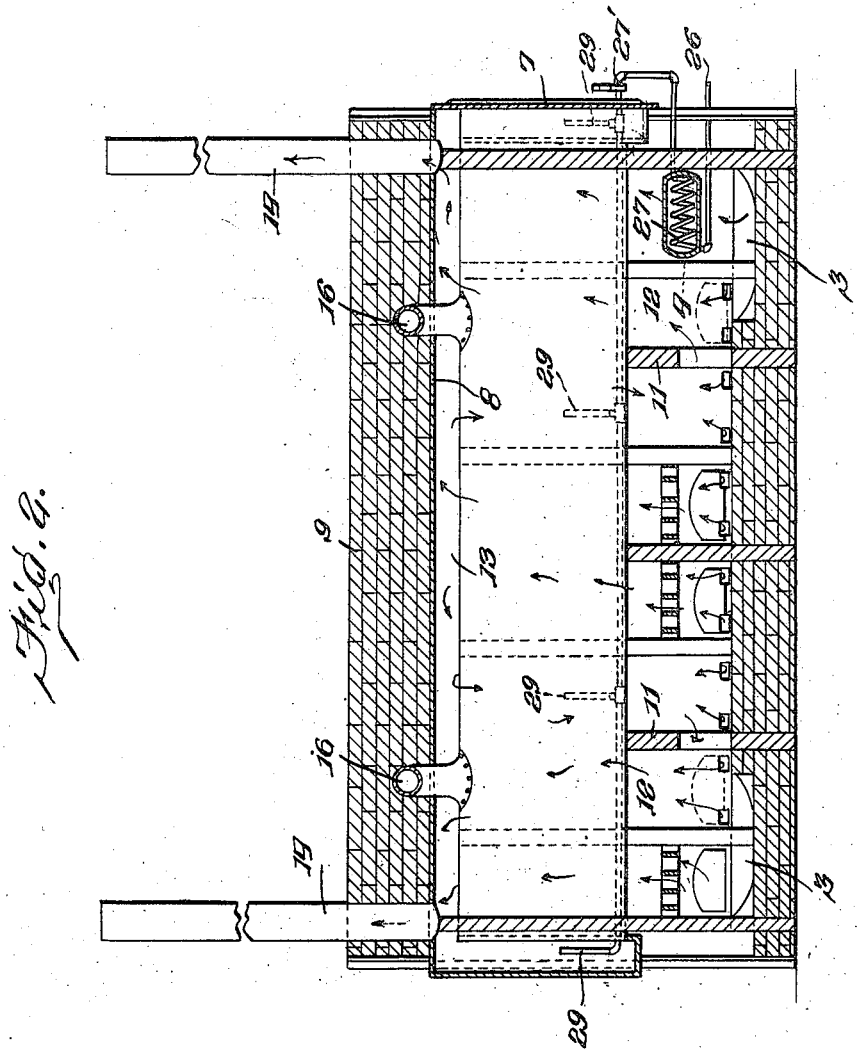
Inventor
L. Hanson
Attorney

UNITED STATES PATENT OFFICE.

LOUIS HANSON, OF WILMINGTON, NORTH CAROLINA.

PROCESS FOR RECOVERING OIL AND OTHER PRODUCTS WHICH ARE FORMED DURING THE DESTRUCTIVE DISTILLATION OF WOOD.

1,169,956. Specification of Letters Patent. Patented Feb. 1, 1916.

Application filed December 16, 1915. Serial No. 67,223.

*To all whom it may concern:*

Be it known that I, LOUIS HANSON, a citizen of the United States, residing at Wilmington, in the county of New Hanover and State of North Carolina, have invented certain new and useful Improvements in Processes for Recovering Oil and other Products Which are Formed During the Destructive Distillation of Wood, of which the following is a specification.

My invention relates to an improved process for recovering oil and other products which are formed during a steam and heat destructive process distillation of wood.

The primary object of the invention is to provide a process for obtaining a product from the distillation of wood, which product will be of a lower degree of specific gravity and viscosity, and which will be free from impurities and carboniferous residue.

A further object of the invention is to provide a process and means for extracting a greater proportion of oil per unit quantity of wood consumed than the processes heretofore employed.

In carrying out my improved process I quickly raise the temperature in a retort in excess of 650° Fr. to 700° Fr. more or less within a reasonable range, and maintain the temperature during the period of liberating the vapor from the wood. I also introduce super-heated steam to the retort of substantially the approximate temperature of that in the retort.

In the accompanying drawings; I have illustrated a structure for carrying out my improved process, and in said drawings: Figure 1 represents an elevation partially in section of my improved apparatus. Fig. 2 is a central longitudinal section of the same.

1 indicates brick work forming part of the furnace, divided by a central wall 2. The wall 2 divides the apparatus into two separate furnaces, and but one will be described.

Extending across the brick work between the walls 1 and 2, is a grate 3, and above same is an arch fire wall 4, formed at intervals in the side portions with flues 5. Supported above the arch wall is a retort 6, formed at its ends with annular heads 7, and inclosed at the top by a top plate 8. Supported on the walls 1 and 2, and above the top plate is a suitable brick work as at 9, to completely close the retort.

Centrally disposed between the opposite ends of the retort 6, is a division wall 10, to form two separate fire boxes at opposite ends of the retort. Between the central wall 10 and the end walls of the furnace are vertical partitions 11, to form flues 12, which communicate with the flues 5, formed in the arch fire wall 4. The upper ends of the flues 12 communicate with a space 13 formed between the plate 8, the retort 6, the end wall 7, and the central partition 10, and communicating with each of these spaces is a stack 14.

Communicating with each retort is an enlarged pipe or conduit 16, which leads to a condensing coil 17, suitably supported in a tank 18, which contains water to cool the coil 17 in the usual manner. The lower end of the coil communicates with a trap 19, connected by a pipe 20, with a receptacle 21, into which the distilling oil passes. Extending from the top of the trap 19 is a pipe 22, extended into the tank 18, and formed into an auxiliary coil 23, the opposite end leading into the top of the receptacle 21, as indicated at 24.

To one side of the apparatus is located a steam boiler 25, and extending therefrom is a pipe 26 which leads to a superheater 27, located in the flue space 28, above the arched fire wall 4. Extending from the superheater is a pipe 27', which has branches 28 leading into the bottom of each of the retorts, and from these branches at intervals are curved perforated pipes 29, located inside the retort and adapted to inject superheated steam thereinto.

In carrying out the process the retorts are charged with a determined quantity of wood which is partly supported on the semicircular steam pipe 29, and fire is started to quickly raise the temperature in the retort to approximately 700° Fr. As the superheater is located in the path of the products of combustion, the steam is super-heated to approximately 700° Fr. and is injected into the retort through the said pipes 29. The super-heated steam is introduced into the retort when the temperature in the latter is in excess of 450 or 500° Fr. as it is quite essential that any and all steam introduced with the liberated vapors be dry. The steam is forced upward through the interstices of the charge and the volatilized compounds liberated from the wood and carried upward, primarily owing to their relative low density, and secondarily, owing to the propulsive effect of the jets of steam.

When the temperature in the retort and the superheated steam is in excess of 650° Fr. or better about 700° Fr. such temperature must be maintained approximately uniform within a certain range, throughout the period of liberation of the vapors from the wood. It has been found that a substantially even temperature of about 700° Fr. in the retort for approximately 30 to 32 hours will liberate all the oil vapors, and the only residue is a fine powdered charcoal. The temperature in the retort and that of the super-heated steam will vary between seven and eight hundred degrees Fr., the best results being obtained within this range, it depending altogether on the grade of wood as to what uniform temperature is to be maintained. The vapor is further conducted by the pipe 16 to the condenser pipes 17, to be converted into liquid form. Any vapor that is not condensed during its passage through the pipes 17, upon entering the trap 19, pass upward through the pipe 22, and into the supplemental condenser 23, where its condensation will be insured.

The vapors which are liberated during the destructive distillation of wood are composed of light vapors which include pyroligneous acid, wood turpentine, light oil of pine, etc., and heavy vapors which include quantities of oil of pine, flaky carbon, and resins having high boiling points. In all the processes known to me, the heavy vapors are condensed, and subsequently withdrawn from the retort while the lighter vapors are condensed.

In my process, the effect of the superheated steam in coming in contact with the heated wood is to first assist in carrying the vapors upward toward the mouth of the conducting pipe 16; and further as the vapors arise, they are subjected to the combined action of the superheated steam and the continued and substantially uniform intense heat which is present throughout the entire volume of the retort. The light vapors readily pass out of the retort while the molecular structure of the heavy vapors is disrupted, and a series of compounds formed which are similar to the above mentioned light vapors, are volatile, and pass out of the retort with the steam. This action is similar to the cracking process in petroleum distillation, the cracking action taking place for the purpose of scattering and breaking the molecules to insure of the obtaining all of the oil. As a result of this process there is no tarry residue formed in the retort or left over after the process of distillation is complete, but every particle of volatile matter originally present in the wood is distilled over into the condenser, which is found to contain a highly mobile liquid, while the substance remaining in the retort is found to be a mass of dry charcoal.

I find in carrying out my process the amount of free carbon in the oil is a minimum quantity, due to the fact that the continuous and substantially uniform temperature in the retort and the super-heated steam oxidizes the free carbon molecules and cracks the compound molecules of the oil to such an extent that carbon molecules cannot, to any great extent form. This condition lends greatly toward the production of a very light, mobile oil, and one having a high flash point.

The necessity for providing a furnace at each end of the retort and the system of flues employed is at once apparent when it is considered that in order to secure the above mentioned "cracking" action, the whole interior of the retort must be highly heated, and especially the upper portions adjacent the mouths of the conducting pipes 16.

Heretofore the product of wood distillation was a thick black liquid generally heavier than water, owing to an admixture of free carbon and tarry matters, while the product obtained by my process is much lighter in color and has a specific gravity of substantially 0.988; this is of inestimable value when the oil is used in the well known flotation process for the recovery of metals in metal mining.

What I claim is:

1. The process of obtaining oil from wood which consists in quickly subjecting a confined body of wood to the action of heat at a temperature in excess of 650° F. and uniformly maintaining approximately the same temperature throughout the period of extracting the oil from the wood, and simultaneously upwardly injecting superheated steam in the retort, whereby the vapors liberated from the wood are carried upward with the steam and are caused to travel coincidently with said steam and subsequently condensing the mixture to produce oil.

2. The process of obtaining oil from wood which consists in quickly subjecting a confined body of wood to the action of heat at a temperature in excess of 650° F. and uniformly maintaining approximately the same temperature throughout the period of extracting the oil from the wood, and simultaneously injecting a superheated steam in the retort to mix with the vapors liberated from the wood and coincidently carry said vapor and steam from the retort and subsequently condensing the mixture to produce oil.

3. The process of obtaining oil from wood which consists in quickly subjecting a confined body of wood to the action of destructive heat at a temperature in excess of 650° F. and simultaneously injecting into the retort superheated steam at a temperature in excess of 650° F. to mix with the vapors liberated from the wood, and maintaining in the retort approximately a uniform temperature in excess of 650° F. and coincidently carrying said vapor and steam from the retort and subsequently condensing same.

In testimony whereof I affix my signature in the presence of two witnesses.

LOUIS HANSON.

Witnesses:
 JNO. IMIRIE,
 MIRIAM STERN.